UNITED STATES PATENT OFFICE.

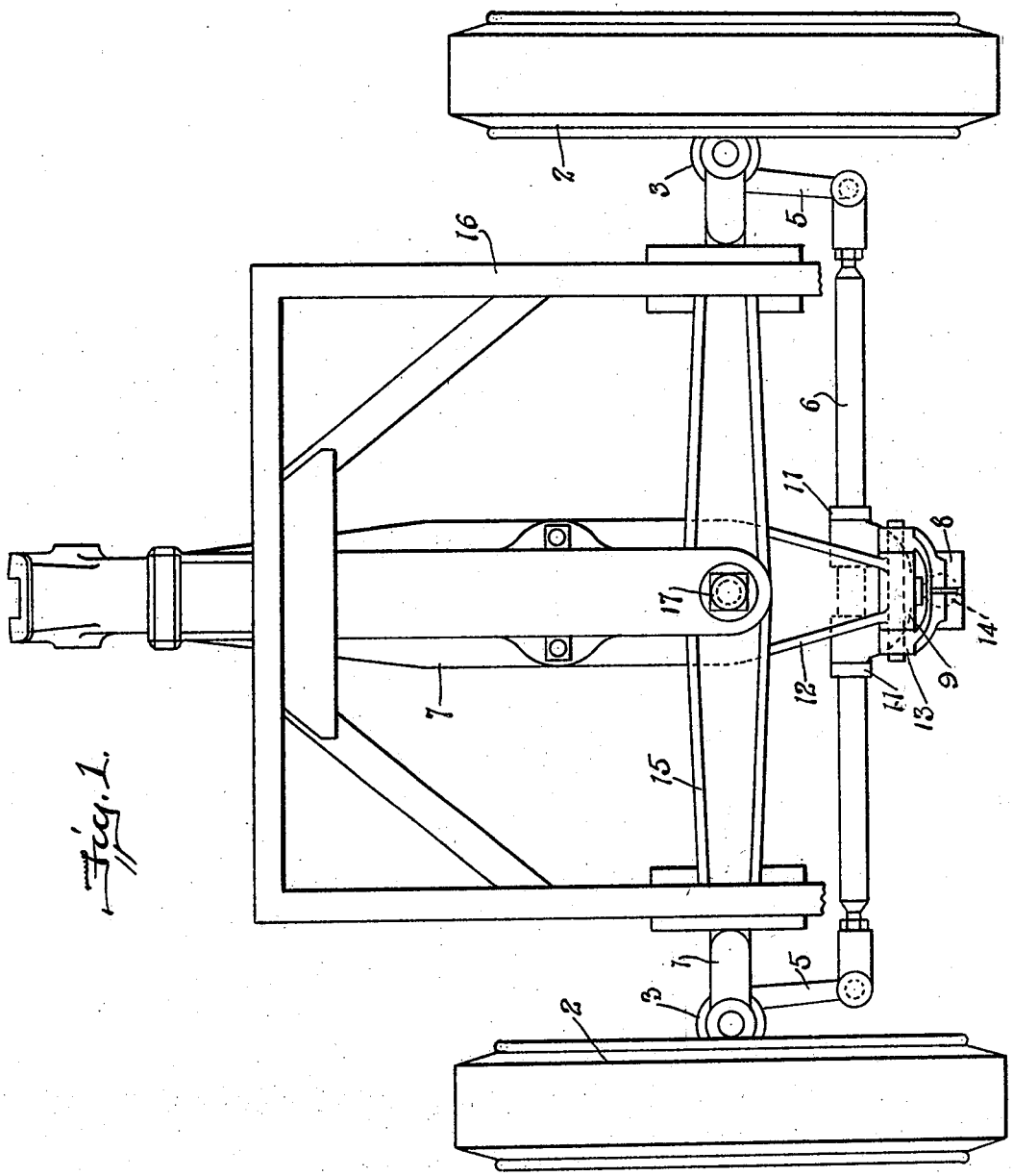

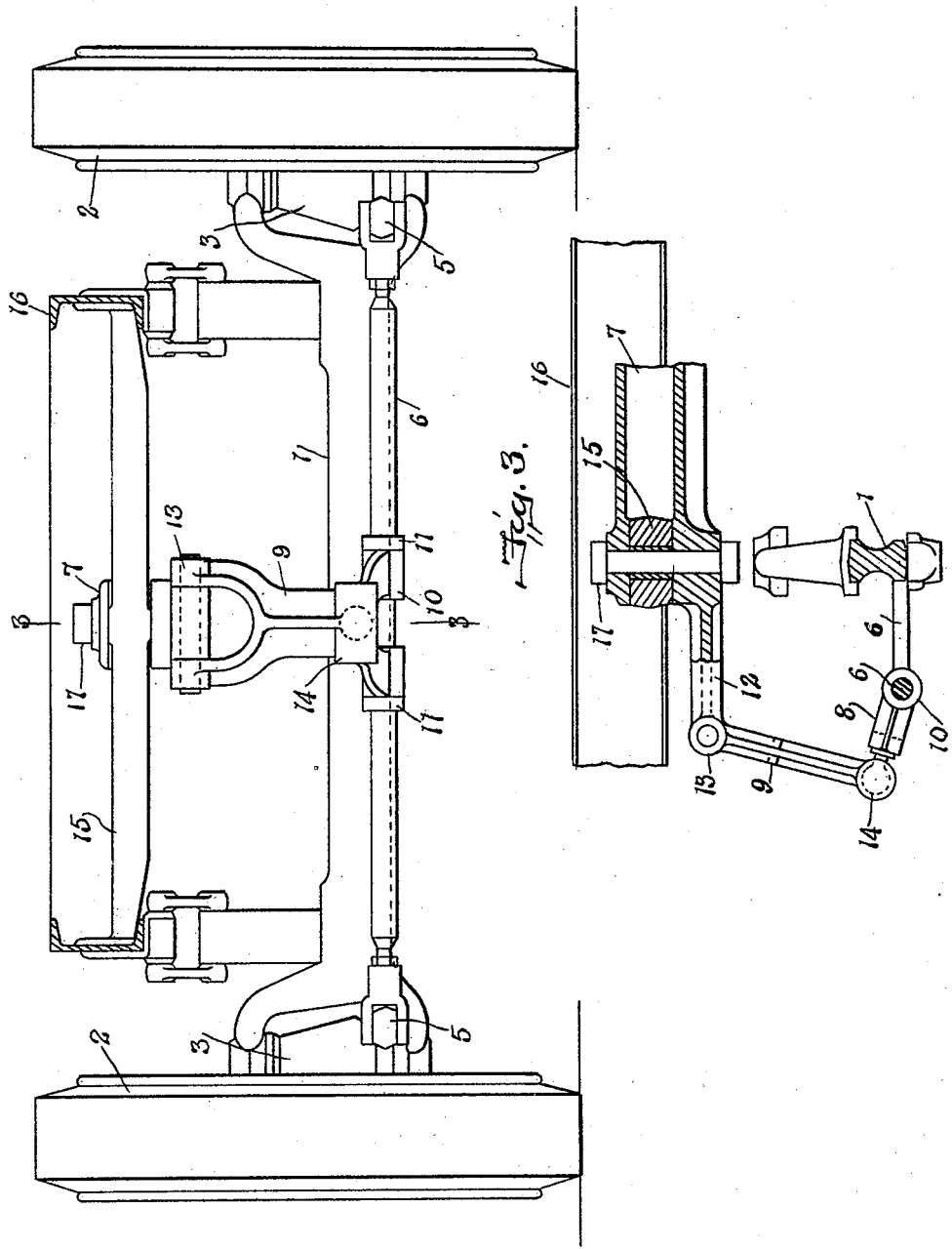

JOHN F. ECCARD, OF TROY, OHIO, ASSIGNOR TO THE TROY WAGON WORKS COMPANY, OF TROY, OHIO, A CORPORATION OF OHIO.

STEERING DEVICE FOR VEHICLES.

1,398,588.  Specification of Letters Patent.  Patented Nov. 29, 1921.

Application filed August 27, 1919. Serial No. 320,087.

*To all whom it may concern:*

Be it known that I, JOHN F. ECCARD, a citizen of the United States, residing at Troy, in the county of Miami and State of Ohio, have invented certain new and useful Improvements in Steering Devices for Vehicles, of which the following is a specification, reference being had therein to the accompanying drawing.

This invention relates to steering devices for vehicles and has for its particular object to provide improved steering mechanism for trailer vehicles, the invention in its present form being especially applicable for use in connection with automobile trailers.

A common difficulty experienced heretofore in the operation of trailers of this character consists in side and end sway of the frame and deflection or whipping movement of the steering wheels caused, for instance, by unequal loading of the truck or an uneven road over which the trailer travels, or both. Both of these conditions are obviously objectionable, one tending to increase the other, so that under even average loading and road conditions it becomes impracticable to operate the trailers beyond a relatively low speed, such being the case especially where automobile trailers are used for carrying passengers as the element of danger of personal injuries resulting to passengers by upsetting of the vehicle or being catapulted therefrom.

The solution of this problem is generally recognized by manufacturers and users of automobile trailers as being of primary importance in the further commercialization of trailers, particularly as passenger carrying vehicles. The problem is essentially one of suitable steering mechanism. The steering of the trailers being effected indirectly through its connections with the leading vehicle, the problem has presented peculiar difficulties which, as far as I am aware, have heretofore withstood complete solution. Various forms of improved steering mechanism have been evolved, but in none of known use heretofore has a complete and practical solution of the above stated difficulties been found.

It is therefore an object of the present invention to provide a steering mechanism for automobile trailers whereby side sway of the trailers and whipping movement of the steering wheels is eliminated under ordinary load and road conditions, or at least minimized to such an extent as to be negligible.

The invention consists, as here shown, in pivoting the draw bar, by means of which the trailer is attached to the leading vehicle, to the trailer frame or body substantially in vertical alinement with the fixed axle of the steering truck and in longitudinal alinement therewith normally and with the general forward movement of travel. At its rear end the draw bar extends to a point substantially beyond the center line of the pivotal connection of the steering rod with the steering arms, and is connected to the former by two angularly disposed yokes, the one yoke being pivotally connected to and adapted to move with the draw bar in the up and down movements thereof and to move pivotally relatively thereto; the other yoke being pivotally connected to the steering rod and connected to the first yoke by a ball and socket joint. This construction causes the steering rod to travel the same distance as the lower end of the yoke connected to the draw-bar. It will thus be seen that the steering-rod, notwithstanding it is closer to the draw-bar pivot than the rear end of the draw-bar, will nevertheless travel farther and faster than the rear end of the draw-bar when the latter is actuated. The result is that the steering wheels are turned more quickly than in the trailers heretofore constructed.

The extension of the draw bar and the pivotal connection therebetween and the steering arms act as a compensating mechanism to neutralize the conjoint side sway of the frame and lateral deflection of the steering wheels. As with the old types of trailer steering mechanism, side sway of the frame tended to increase both in and out deflection of the wheels and vice versa, so with the present improved construction decreasing or elimination of the one tends to decrease or eliminate the other, the result being that with the application of the invention, automobile trailers may be operated at all normal speeds without developing in any material degree the objectionable side sway of the frame and whipping action of the steering wheels referred to.

With this general statement of the construction, operation and objects of the invention, the mechanical organization thereof in the form here shown will be readily understood from the accompanying drawings and the following detailed description. I wish it to be understood, however, that while the invention is here shown in one form of preferred construction the specific details of the arrangement are for purposes of illustration only, as various modifications thereof may readily be made by those familiar with or skilled in the art, without departing from the underlying principle or the spirit of the invention.

In the drawings:

Figure 1 is a plan view of the front truck and a portion of the frame of a trailer to which my improved steering mechanism has been applied;

Fig. 2 is a rear elevation of the construction shown in Fig. 1; and

Fig. 3 is a detailed vertical sectional view taken on the line 3—3 of Fig. 2.

As here shown the front truck of the trailer consists of the usual rigid axle 1, steering wheels 2, vertical steering journals 3; the wheels being mounted in the usual manner on horizontal spindles, which are preferably integral with the journals 3. Steering arms 5 are also preferably made integrally with the journals 3, and are joined together at their outer ends by a steering rod 6 which is connected to the draw bar 7 by two yokes 8 and 9, the yoke 8 being secured to the steering rod by a pivot joint 10, and held against lateral movement thereon by collars 11. The yoke 9 is secured to the rearwardly extending end 12 of the draw bar by a pivot joint 13 and to the yoke 8 by a ball and socket joint 14. The draw bar is pivotally connected to a cross frame member 15 of the main frame 16 by a king bolt 17.

It will be observed that the steering rod 6 is substantially in a horizontal plane with the lower portion of the axle 1, and that the ball and socket joint 14 is considerably in the rear of the steering rod and that the yoke 9 in its mean position as shown in Fig. 3 of the drawings, is inclined upwardly and forwardly therefrom to its pivotal connection with the draw bar, the latter extending rearwardly substantially in a horizontal plane or parallel to the main frame 16.

The pivot joints 10 and 13 and ball and socket joint 14 compensate for the up and down movement of the frame without affecting the steering rod and therefore without any tendency to cause deflection in the steering wheels. Side sway of the frame is compensated for to some extent without causing deflection of the wheels by the ball and socket joint 14, but principally by locating the joint 14 below the king bolt 17 and at some distance from the axle 1. In the preferred form the draw-bar is extended back of the king bolt 17; the yoke 9 is pivoted thereto and extends downwardly and rearwardly; the yoke 8 is secured to the lower end of the yoke 9 by a ball and socket joint, and extends forwardly and downwardly therefrom; and the forward end of the yoke 8 is pivoted to the steering rod 6. If desired the yoke 8 may be rigidly fastened to the steering rod 6 and the steering rod pivotally connected to the steering arms 5, so that the yoke 8 may oscillate about a horizontal axis. By this arrangement of parts and connections the steering wheels can be turned more quickly than was possible in prior constructions, and swaying of the frame and whipping of the wheels are eliminated. In the construction illustrated, the steering rod 6 moves at the same rate of speed as the joint 14.

Thus the principle of my invention consists in interposing between the draw bar or main steering member and the steering arms or connections by which the steering wheels are directly controlled, an equalizing mechanism which will act to compensate for or neutralize the side sway of the frame relative to the steering wheels and vice versa.

As here shown the connection of the draw bar to the steering arms is made in the rear of the fixed axle, but it is obvious that the connection with suitable modification of construction may be made in front of the axle and that the same principle of equalization will apply in one application as in the other.

The construction herein shown and described is one of several preferred forms which constitute the subject matter of copending applications for Letters Patent in which the underlying principle of invention is essentially the same, but differing as to details of construction and arrangement. As far as I am aware, these inventions are the first to successfully solve the problem to which the objects of the inventions are directed. I wish to claim the herein invention broadly therefore as defined and comprehended in the accompanying claims.

Having thus fully described my invention, what I claim as new and desire to secure by Letters Patent, is:—

1. In a trailer, the combination, with a spring-supported frame and a draw-bar pivoted thereto, of a fixed axle, steering knuckles pivoted to said axle, wheels rotatably connected to said knuckles, steering arms connected to said knuckles and a tie rod connecting said arms, the draw-bar having an extension projected beyond its pivot, a yoke pivoted to said extension, and another yoke swivelly connected at one end with the first yoke at a point more remote from the axle than said tie rod and at the other end pivoted on said tie rod, whereby said steering arms are made to travel through an arc greater than that through which the draw-bar travels.

2. In a trailer, the combination, with a spring-supported frame and a fixed axle having steering knuckles carrying wheels and provided with interconnected steering arms, of a draw-bar pivoted to the frame and having an extension beyond its pivot, a yoke pivoted to said extension and inclining thence to a point more remote from the axle than its pivot, and another yoke swiveled to the first yoke at said more remote point and extending thence toward the axle and pivotally attached to the interconnected steering arms, whereby the steering arms move through a greater arc than that through which the draw-bar travels.

3. In a trailer, the combination, with a frame and an axle, of a draw-bar pivoted to the frame and having an extension, a yoke pivoted to said extension at one end, another yoke swiveled at one end to the first yoke, a steering rod carrying the other end of the second yoke, and steering arms to which the rod is connected, the distance from the axle to the steering rod being less than the distance from the pivot of the draw bar to the connection of its extension with the yoke, and the distance of the connection of the two yokes from the draw bar being still greater.

In testimony whereof, I affix my signature.

JOHN F. ECCARD.